United States Patent
Gilliland et al.

(10) Patent No.: US 10,372,138 B2
(45) Date of Patent: *Aug. 6, 2019

(54) FLASH LADAR COLLISION AVOIDANCE SYSTEM

(71) Applicant: Continental Advanced Lidar Solutions US, LLC., Carpinteria, CA (US)

(72) Inventors: Patrick Gilliland, Santa Barbara, CA (US); Roger Stettner, Santa Barbara, CA (US); Laurent Heuhebaert, Santa Paula, CA (US); Bart M Goldstein, Santa Barbara, CA (US)

(73) Assignee: Continental Advanced Lidar Solutions US, LLC, Carpinteria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/669,090

(22) Filed: Aug. 4, 2017

(65) Prior Publication Data
US 2017/0357260 A1    Dec. 14, 2017

Related U.S. Application Data

(63) Continuation of application No. 14/740,518, filed on Jun. 16, 2015, now Pat. No. 9,753,462, which is a
(Continued)

(51) Int. Cl.
*G05D 1/02* (2006.01)
*G01S 7/481* (2006.01)
(Continued)

(52) U.S. Cl.
CPC ............ *G05D 1/024* (2013.01); *G01S 7/4813* (2013.01); *G01S 7/4972* (2013.01); *G01S 17/936* (2013.01);
(Continued)

(58) Field of Classification Search
CPC ........ G01S 7/481; G01S 17/89; G01S 7/4802; G01S 7/4816; G01S 7/4863; G01S 17/87;
(Continued)

(56) References Cited

U.S. PATENT DOCUMENTS 4,403,220 A    9/1983  Donovan
5,529,138 A    6/1996  Shaw et al.
(Continued)

OTHER PUBLICATIONS

International Search Report and Written Opinion, Korean Patent Office, dated Jun. 29, 2012 for corresponding PCT Patent Application No. PCT/US2011/058773.

*Primary Examiner* — Luke D Ratcliffe

(57) ABSTRACT

A vehicular collision avoidance system comprising a system controller, pulsed laser transmitter, a number of independent ladar sensor units, a cabling infrastructure, internal memory, a scene processor, and a data communications port is presented herein. The described invention is capable of developing a 3-D scene, and object data for targets within the scene, from multiple ladar sensor units coupled to centralized LADAR-based Collision Avoidance System (CAS). Key LADAR elements are embedded within standard headlamp and taillight assemblies. Articulating LADAR sensors cover terrain coming into view around a curve, at the crest of a hill, or at the bottom of a dip. A central laser transmitter may be split into multiple optical outputs and guided through fibers to illuminate portions of the 360° field of view surrounding the vehicle. These fibers may also serve as amplifiers to increase the optical intensity provided by a single master laser.

19 Claims, 12 Drawing Sheets

Related U.S. Application Data continuation of application No. 14/178,675, filed on Feb. 12, 2014, now Pat. No. 9,086,486, which is a continuation of application No. 13/285,800, filed on Oct. 31, 2011, now Pat. No. 8,692,980.

(60) Provisional application No. 61/408,897, filed on Nov. 1, 2010.

(51) Int. Cl.
  *G01S 7/497* (2006.01)
  *G01S 17/93* (2006.01)

(52) U.S. Cl.
  CPC .... *G05D 1/0214* (2013.01); *G01S 2007/4977* (2013.01)

(58) Field of Classification Search
  CPC ...... G01J 3/0291; G01J 3/0264; G01J 3/0289; G01J 3/10; G01J 3/18; G01J 3/26; G01J 3/36; G01J 3/0208; G01J 3/027; G01J 3/2823; G01J 2003/2826
  See application file for complete search history.

(56) References Cited

U.S. PATENT DOCUMENTS

| | | |
|---|---|---|
| 5,629,524 A | 5/1997 | Stettner et al. |
| 5,696,577 A | 12/1997 | Stettner et al. |
| 6,133,989 A | 10/2000 | Stettner et al. |
| 6,362,482 B1 | 3/2002 | Stettner et al. |
| 6,414,746 B1 | 7/2002 | Stettner et al. |
| 7,061,372 B2 | 6/2006 | Gunderson et al. |
| 2001/0024171 A1 | 9/2001 | Nishimura |
| 2002/0003473 A1 | 1/2002 | Makita et al. |
| 2002/0086907 A1 | 7/2002 | Standke et al. |
| 2002/0117340 A1 | 8/2002 | Stettner |
| 2004/0004707 A1 | 1/2004 | DeFlumere |
| 2005/0068517 A1* | 3/2005 | Evans .............. G01S 7/481 356/5.01 |
| 2008/0133136 A1 | 6/2008 | Breed et al. |
| 2009/0228159 A1* | 9/2009 | Flowers ............. F41G 7/226 701/3 |
| 2010/0208244 A1 | 8/2010 | Earhart et al. |
| 2011/0188113 A1 | 8/2011 | Dede et al. |

* cited by examiner

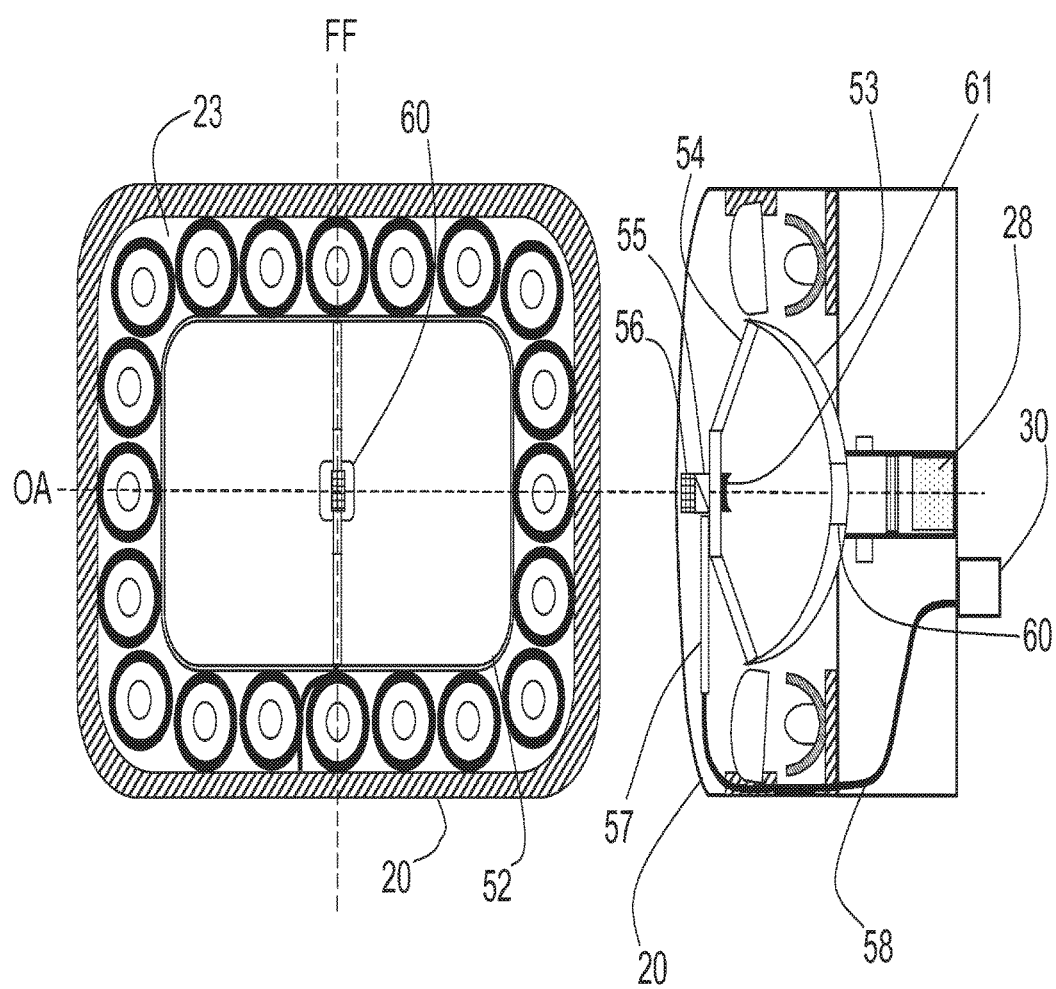

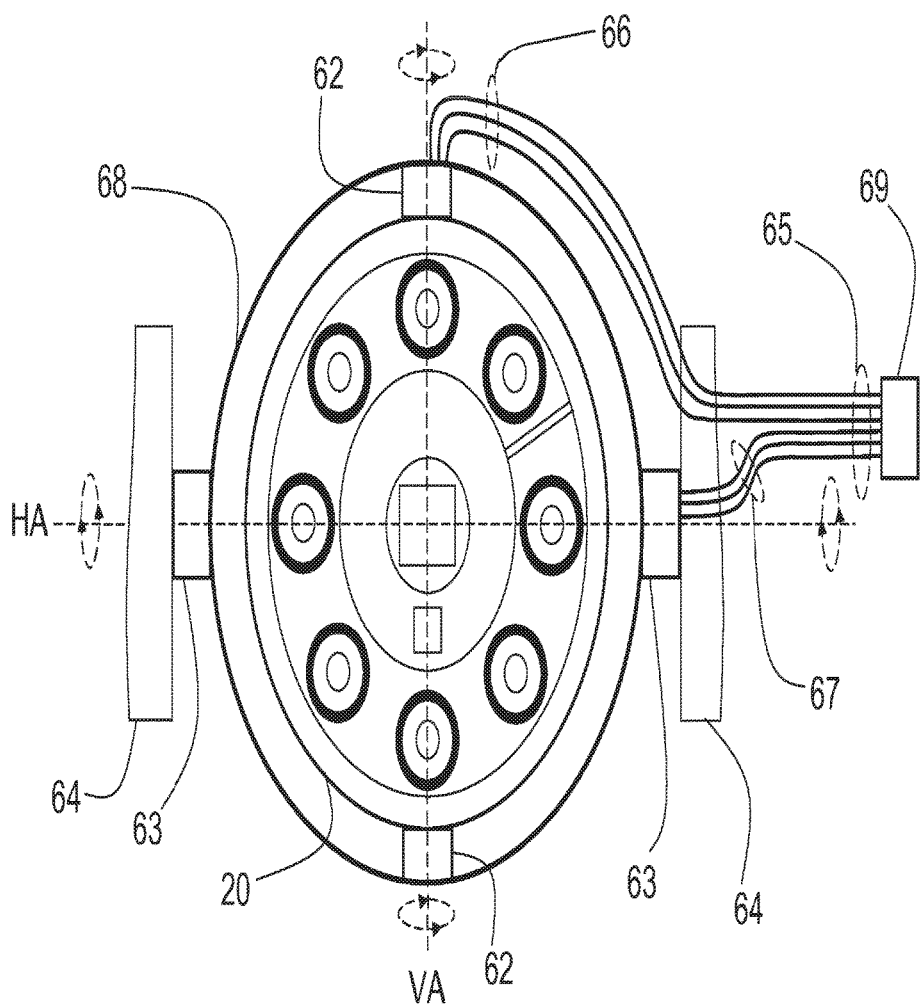

FLASH LADAR COLLISION AVOIDANCE SYSTEM

REFERENCES TO RELATED APPLICATIONS

This application is a continuation of prior application Ser. No. 14/740,518, filed Jun. 16, 2015, which is a continuation of prior application Ser. No. 14/178,675, filed Feb. 12, 2014, which is a continuation of prior application Ser. No. 13/285,800, filed Oct. 31, 2011, which claims the benefit of U.S. provisional application No. 61/408,897, filed on Nov. 1, 2010, the disclosures of which are each incorporated by reference.

BACKGROUND

Field

The present invention relates to the field of remote sensing of objects using LADAR and the application of LADAR to vehicular collision avoidance.

Related Art

Many collision avoidance systems have been built which rely on microwave radars, scanning LADARs, and passive thermal and IR sensing. LADAR systems typically require the transmission of a high energy illuminating pulse. Historically, these systems rely on solid state lasers operating in the near infrared with a lasing media of Neodymium-YAG or Erbium doped glass. Many of these systems utilize multiple pulses over a period of time to detect remote objects and improve range accuracy. These systems are often based on a single detector optical receiver. To develop a complete picture of a scene, the laser and optical receiver must be scanned over the field of view, resulting in a shifting positional relationship between objects in motion within the scene. Flash ladar systems overcome this performance shortcoming by detecting the range to all objects in the scene simultaneously upon the event of the flash of the illuminating laser pulse.

U.S. Pat. No. 4,403,220 awarded to Donovan describes a collision avoidance system based on a scanning microwave radar. U.S. Pat. No. 5,529,138 issued to Shaw and Shaw details a vehicle collision avoidance system based on a scanning LADAR or sets of scanning LADARs. U.S. Pat. No. 7,061,372 awarded to Gunderson, et. al. describes a modular collision avoidance sensor which may incorporate any number of sensor technologies, including LADAR, ultrasound, radar, and video or passive infrared sensing.

The present invention is a collision avoidance system enabled by a plurality of vehicle mounted flash ladar sensors incorporating elements of the flash ladar technology disclosed in Stettner et al, U.S. Pat. Nos. 5,696,577, 6,133,989, 5,629,524, 6,414,746B1, 6,362,482, and U.S. patent application US 2002/0117340 A1, and which provides with a single pulse of light the range to every light reflecting pixel in the field of view of the flash ladar sensor as well as the intensity of the reflected light.

SUMMARY OF THE INVENTION

Many attempts have been made to solve the problem of how to create the true 3-D imaging capability and integrate it with a vehicle which would enable a vehicle based collision avoidance. The instant invention makes use of a number of new and innovative discoveries and combinations of previously known technologies to realize the present embodiments which enable the vehicle operator to benefit from a collision avoidance technology with the capacity to provide nearly 360° target detection and monitoring. When integrated with the vehicle navigation and control systems, both collision avoidance and robotic driving are enabled. This ability to operate the LADAR enabled collision avoidance system is provided by practicing the invention as described herein.

This invention relies on the performance of a plurality of multiple pixel, infrared laser radar modules for capturing three-dimensional images of objects or scenes within the field of view with a single laser pulse, with high spatial and range resolution (Flash LADAR). The figures and text herein describe the electrical and mechanical innovations required to enable a cost effective LADAR based collision avoidance system which is particularly well adapted to the automotive environment, where low cost, reliability, and robust environmental performance are basic requirements.

The vehicular collision avoidance system utilizes a pulsed laser transmitter capable of illuminating an entire scene with a single high power flash of light. The vehicular collision avoidance system employs a system controller to trigger a pulse of high intensity light from the pulsed laser transmitter, and counts the time from the start of the transmitter light pulse. The light reflected from the illuminated scene impinges on a plurality of receiving optics and is detected by a number of focal plane array optical detectors housed in independent ladar sensor units. An interconnect system typically comprised of a fiber cable and wire harness connects the individual vehicle mounted ladar sensor units to a central LADAR-enabled collision avoidance system which supports the functions central to the described vehicular collision avoidance system.

The instant invention provides a nearly 360° coverage for a land or sea based vehicle with coverage above and below the plane of travel. While specifically adapted for ground based vehicles, the technology described may be easily applied to boats, hovercraft, and airborne platforms such as helicopters and airplanes. The collision avoidance system pioneers a number of new technical concepts, including the embedding of key LADAR elements within standard headlamp and taillight assemblies, and articulating LADAR sensors adapted to cover terrain coming into view around a curve, at the crest of a hill, and at the bottom of a dip. In one embodiment, a central laser transmitter is split into multiple optical outputs and guided through fibers to illuminate portions of the 360° field of view surrounding the vehicle. In a further embodiment, these fibers also serve as amplifiers to increase the optical intensity provided by a single master laser.

Therefore it is an object of this invention to provide a LADAR enabled collision avoidance system which has low initial cost, high availability, nearly 360° field of view coverage, ability to proactively adapt to variations in terrain, and can be easily integrated into existing ground based vehicles, watercraft, and airborne platforms.

The present invention comprises a vehicular collision avoidance system enabled by a flash ladar with a number of sensors specifically adapted for integration into a moving vehicle. The system described is designed to be manufactured economically, and to be integrated into a vehicle with minimum adaptation of the vehicle. Flash LADAR sensors are detailed which are integrated into a forward looking headlamp assembly which may be actuated on a motorized pivot mount. Side mounted flash ladar sensors are described which are integrated into turn signal indicator light assemblies, and rear view sensors are described which are integrated into taillight assemblies. Additionally, the flash ladar enabled collision avoidance system incorporates a central processing unit which incorporates object recognition software. Based on the objects in the field of view of the ladar sensors, the relative motion of these objects, and the vehicle dynamics, the collision avoidance system central processor produces audible, visible, or tactile warnings to the operator of the vehicle. In some cases posing extreme risk, the collision avoidance system takes active control of the vehicle in order to conduct evasive maneuvers.

BRIEF DESCRIPTION OF THE DRAWINGS

FIG. 7B is a diagram of an integrated ladar sensor and headlamp which features a longer focal length reflecting lens and a remote external laser, with pulsed laser light delivered via an optical fiber.

FIG. 8 is a diagram showing pivot mechanisms attachment to the integrated headlamp and ladar sensor for facilitating two axis angle adjustment.

DETAILED DESCRIPTION OF THE INVENTION

Figure 1:
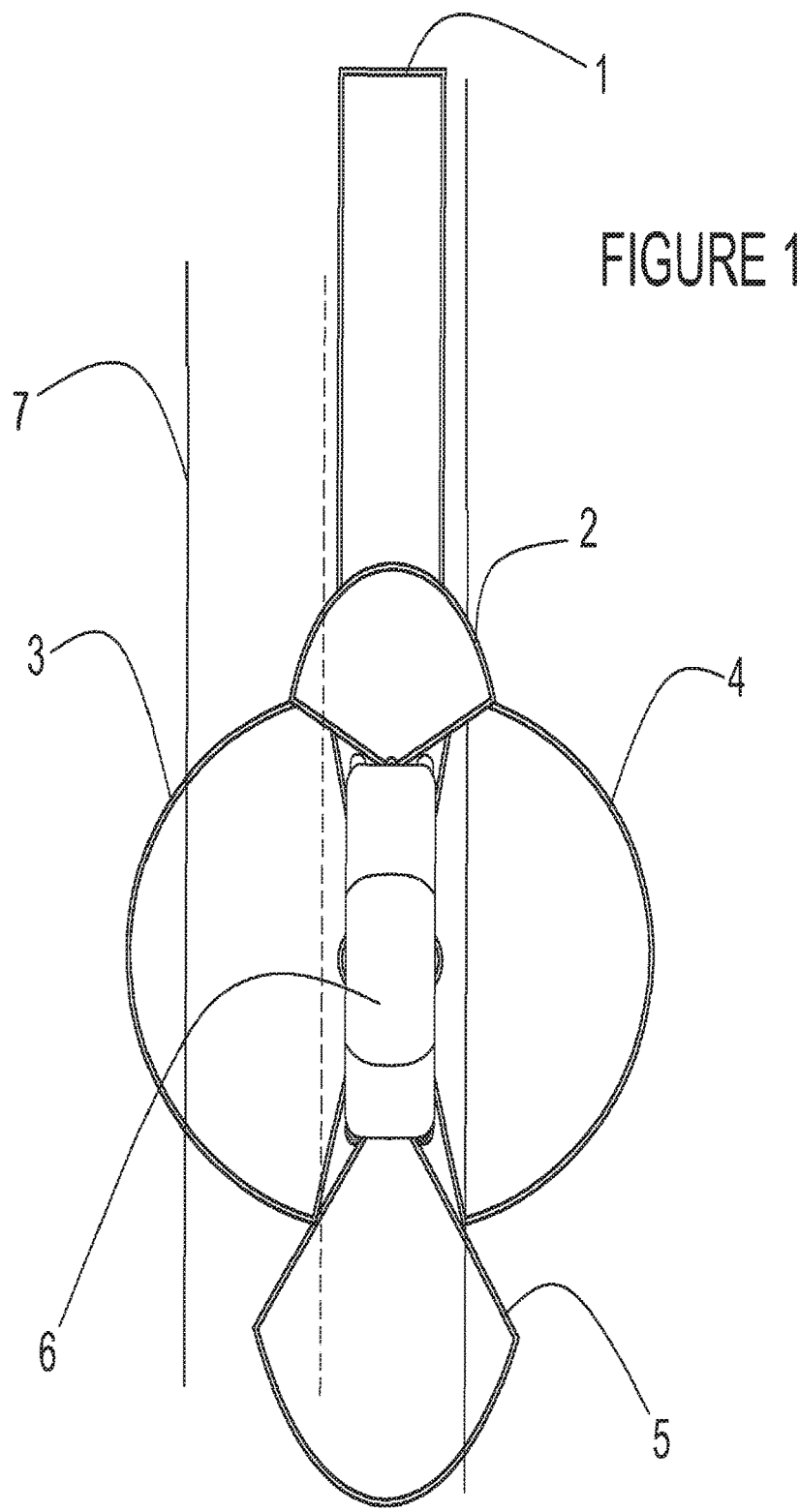
FIG. 1 is an overhead view of an automobile incorporating multiple flash ladar sensors and their overlapping fields of view.
Figure 9:
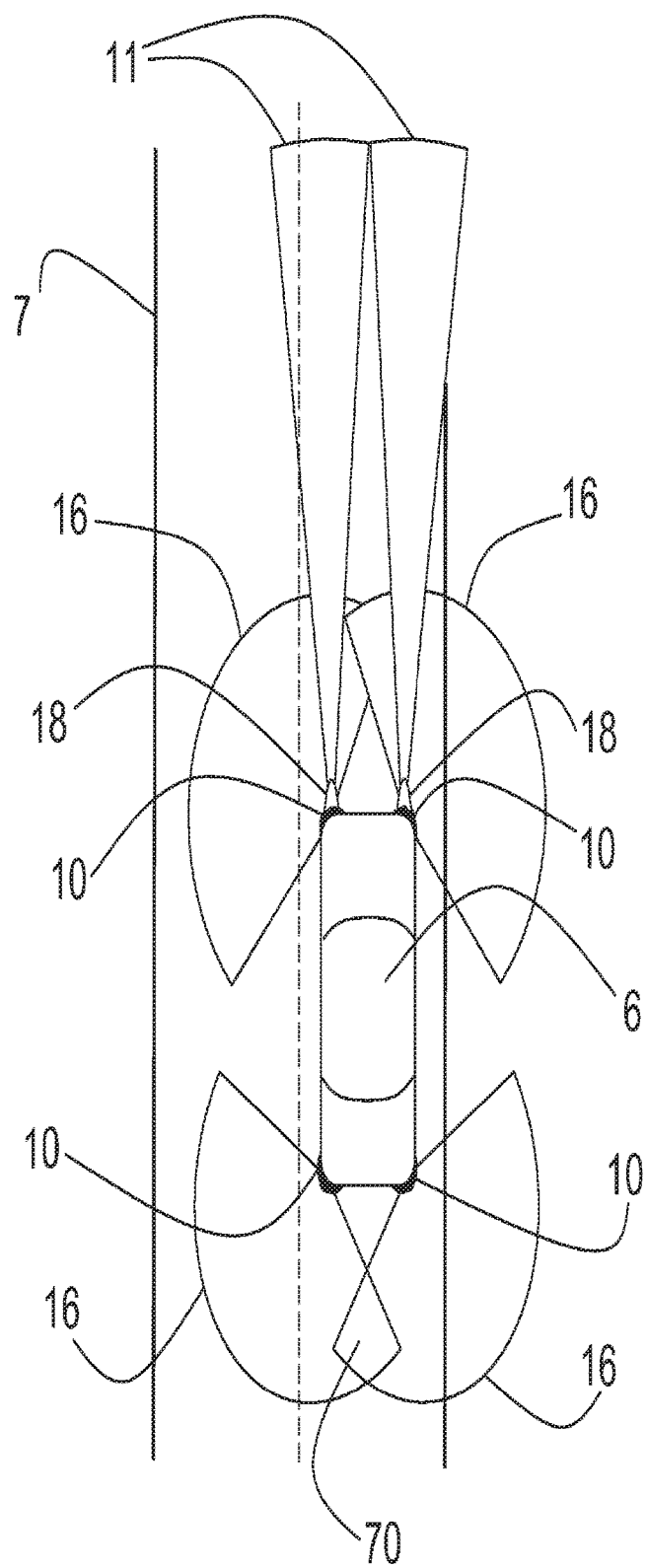
FIG. 9 is an overhead view of an alternative to FIG. 1 showing overlapping fields of view of a ground vehicle employing the ladar sensor of FIGS. 5, 6, 7, and 8, in which the collision avoidance system employs between four and six sensors, each at a corner of the vehicle.
Figure 10:
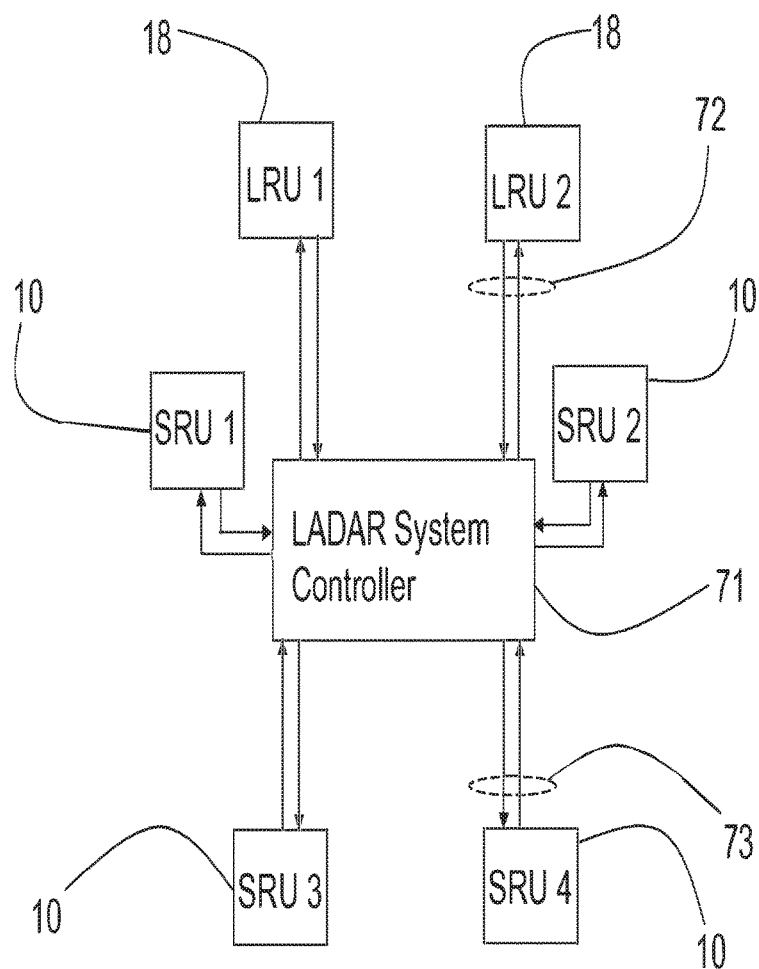
FIG. 10 is a block diagram of a collision avoidance system employing a plurality of independent flash ladar sensors.
Figure 11:
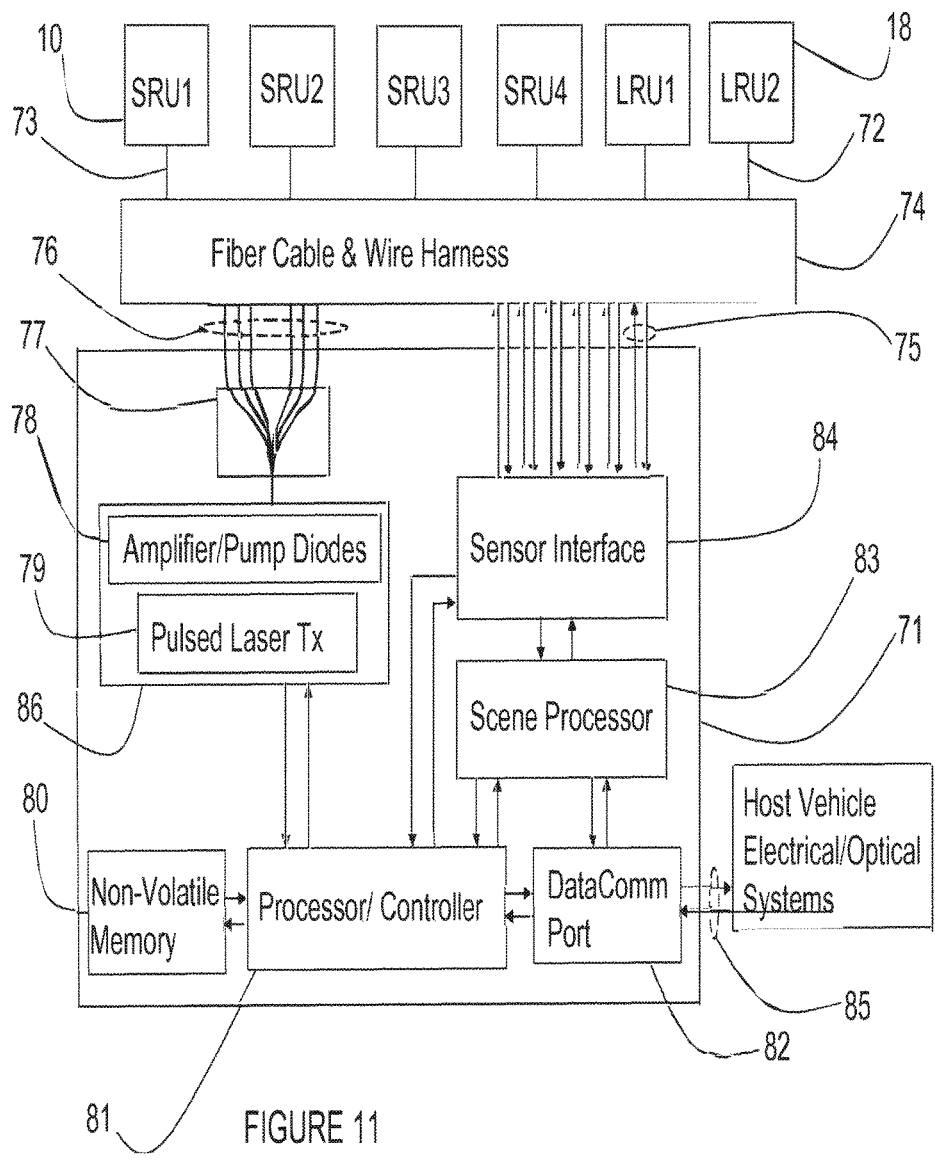
FIG. 11 is a detailed system block diagram of an advanced adaptation of the collision avoidance system of FIG. 10, which incorporates a number of digital and analog signal processing modules and a low power master pulsed laser transmitter with a distributed fiber amplifier and associated pump lasers.

A preferred embodiment of the present invention, the Flash LADAR collision avoidance system (CAS), is depicted in block diagram form in FIGS. 10 and 11. These FIGS. will be discussed in detail once foundational concepts of the LADAR enabled CAS are explained through the discussion of FIGS. 1-9. FIG. 1 is an overhead diagram which shows one pattern of ladar sensor coverage which will enable a collision avoidance digital signal processor to determine which objects in the path of the vehicle, or travelling on an intercept path, necessitate evasive maneuvers by the host vehicle.

The host vehicle 6 may be an automobile, boat, ship, hovercraft, airplane or robotic crawler. FIG. 1 illustrates several basic requirements for a vehicle mounted collision avoidance system. First, a field of view 1 in the direction of travel of the vehicle must extend furthest from the vehicle. The field of view may be rectangular as shown for field of view 1, to project illuminating laser flashes directly in the path of the vehicle at long ranges while driving on a straight highway 7 at high speed, or in an arc, typically with shorter range and wider field of view 2 to detect nearby objects when maneuvering at low speeds, e.g.; parking.

Lateral sensor field of view patterns 3 and 4 monitor left and right sides of the vehicle respectively, and operate at medium ranges, providing input over a wide arc to facilitate low speed maneuvering, and to provide some level of early warning capability for potentially higher speed lateral impact events. A rear facing sensor field of view pattern 5 provides sensor coverage in a similar fashion to the side impact sensors 3 and 4, by detecting stationary or slow moving objects near the rear of the vehicle in a wide arc, thus facilitating low speed maneuvers such as parking, while simultaneously enabling a rear impact sensor with a view of any vehicles approaching from the rear in an uncontrolled manner at higher speeds.

Figure 2:
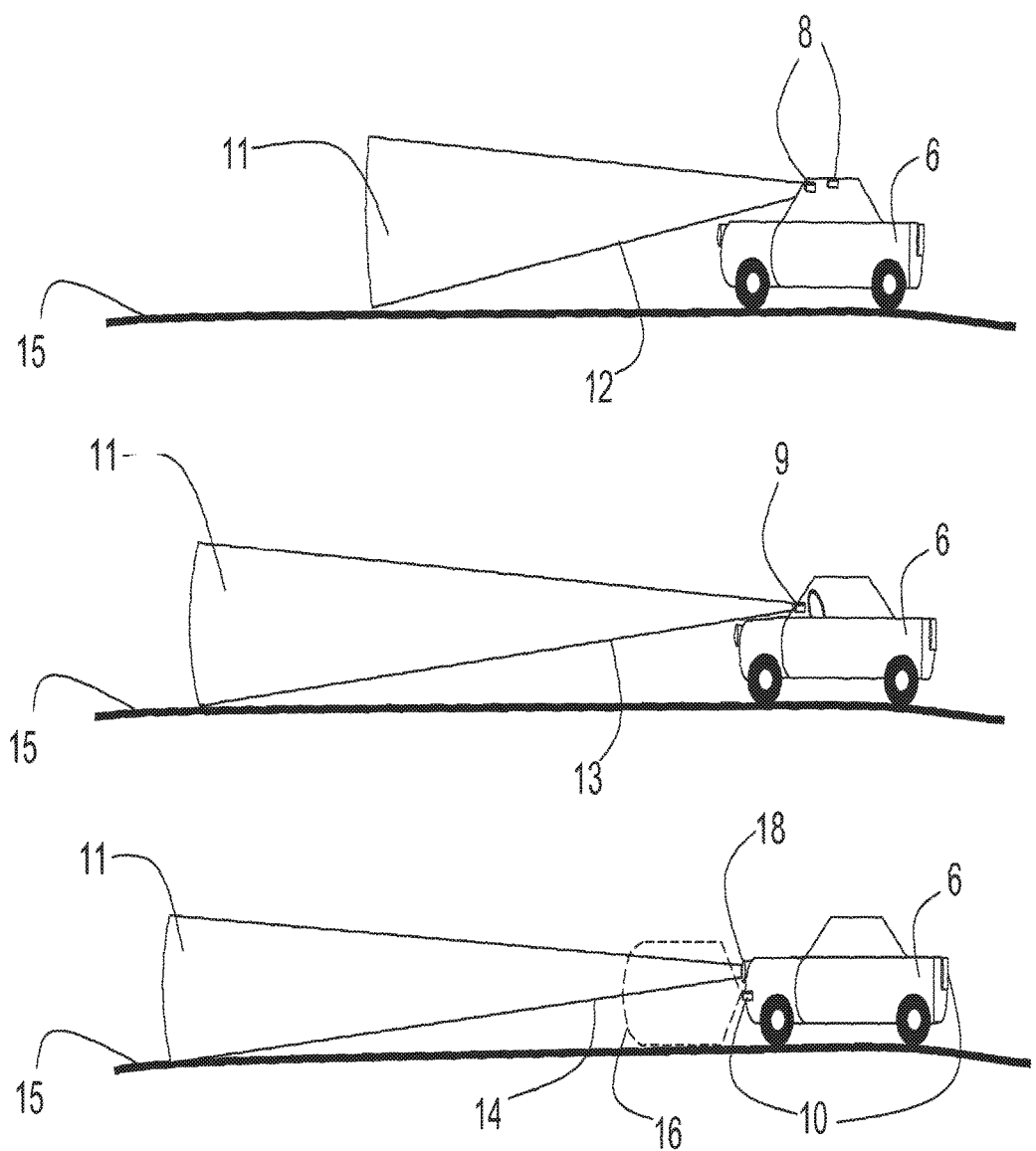
FIG. 2 is a side view of three possible mounting points for the forward looking flash ladar sensors.

FIG. 2 details one of the important design considerations regarding the ladar enabled collision avoidance system. A major issue is the question of where to mount the transmitter or transmitters on the vehicle as well as where the optical detectors should be mounted. In most of the previous work by the present inventors, these transmitters and receivers have been co-located as close as possible with parallel and overlapping fields of view along the same radial axis. By mounting the ladar sensor high on the vehicle, it might be possible to sweep an entire 360° field of view, thus keeping one aspect of system complexity to a minimum. However, as the diagram shows, a high mounted ladar sensor 8 co-located with the rear view mirror or dome light position, blind spots arise in the near field below the projection line 12 of the forward field of view 11 of the high mounted ladar sensor 8. In a similar fashion, these blind spots will appear at the rear of the vehicle below a line of sight from the rear view mirror or dome light position 8 to where this line of sight is cut off by the trunk lid. To a lesser extent, additional blind spots will arise on the left and right side of the vehicle in the near field below a line of sight from the rear view mirror to the bottom of the driver's side window where it connects with the door panel, and likewise on the passenger's side where the window connects with the door panel. Other blind spots arise for a high mounted ladar sensor which are caused by the roof supports at either end of the front windshield, the front and rear doors, and the rear windshield. These are commonly referred to in industry parlance as the A, B, and C pillars, respectively. Additional optical transmission blockages may be caused by the vehicle occupants, seatbacks, headrests, and tissue boxes, stuffed animals, etc., stored on the rear windshield deck. The issues of optical transmission blockages are very similar for a high mounted ladar sensor 8 co-located with either the rear view mirror or the dome light.

As shown in FIG. 2, the distance to where the lower line of sight limit 13 intersects the roadway surface 15 is greater in a dash mounted ladar sensor variant 9 than in the high mounted case shown by line 12. This increase in the blind spots of the dash mounted variant 9 will be further exacerbated in the rear view and sides because of the much lower initial height of the dash mounted sensor 9, creating a much lower angle as in the angle shown between line of sight 13 and roadway 15. Additionally, optical transmission blockages in the passenger compartment such as occupants, seats, headrests, etc. will be exacerbated due to their being directly in the viewing path of a dash mounted ladar sensor 9. These blindspots reduce the ability of the ladar sensor to perform adequately in slow maneuvers such as backing up from a driveway or parking. Though the high mount 8 ladar sensor position is preferable to the dash mount variant 9, both options have significant limitations. At the bottom of FIG. 2, the preferred low level headlamp 18 mounting point or taillight/indicator light level mounting point 10 of the ladar sensor is depicted with a lower line of sight 14. This mounting arrangement substantially reduces the blindspots in the search pattern identified above with respect to both the high mounted dome light or rear view mirror position 8, and the mid-level dash mounted variant 9. High mount 8 and mid-level mounting positions 9 for the ladar sensor would preclude the projection of a near field illumination and search pattern 16 if not mounted at the periphery of the vehicle. Near field illumination pattern 16 can be formed from the same light beam which produces far field illumination pattern 11 using a combination of refractive and diffractive optics. These refractive and diffractive optics may also serve as the collection mechanism for the light reflected from object in the field of view of the ladar sensor. Diffractive optics work on the principle of interference, not bending (refraction) of light. Diffractive optics, which are very thin and compact, are used to shape the laser beam so photons aren't emitted out to the field of view of the receive optics.

Returning to FIG. 1, the coverage pattern in the horizontal plane could be achieved with four independent sensors. Patterns 1 and 2 can be formed from the same ladar sensor using a combination of refractive and diffractive optics for both the transmission of the illuminating light pulses and the collection of the light reflected from objects in the field of view. Patterns 3, 4, and 5 can be produced from an additional three independent sensors placed at strategic points on the vehicle for a total of four independent sensors. However, in an automobile design, the difficulty associated with finding four new points for mounting of ladar sensors should not be underestimated. Engineers tasked with designing an automobile chassis and body would need to accommodate the additional four openings in the body panels and provide electrical wiring harness interfaces and routing of the harness to the new points. There becomes the need to increase the number of parts used in the sub assemblies and the top assembly, and there would need to be additional stations on the assembly line to install each of the new independent ladar sensors.

A more sophisticated approach is to reuse the packaging of the headlamps, turn signals, and taillight/brakelight assemblies for the mounting of the ladar sensors. The advantages of this approach build on a significant body of knowledge gained over many years in the automotive industry. Headlamps and taillights have migrated to the periphery of the vehicle for issues of operation and visibility. Long gone are the days of single headlamps mounted at the forward center of the vehicle like a locomotive. Likewise, most headlamps and taillight/brakelight assemblies are mounted at the corners of the vehicle for reasons of illumination of the area of operation of the vehicle, and for visibility of the vehicle to operators of other vehicles in the vicinity. This great body of knowledge should be built on, rather than lightly disregarded when integrating a new function, the ladar sensor, into a moving vehicle such as an automobile. We expect a much easier path to adoption of this new functionality if it can be integrated with the present functions and hardware associated with the pathway illuminating systems of the vehicle rather than a fully independent approach with major accommodations made to the body and chassis and assembly lines if the ladar sensors are not incorporated into the existing pathway illuminating hardware. Therefore, the integrated headlamp and ladar sensor is developed herein as well as the integrated auxiliary lamp and ladar sensor assembly. By auxiliary lamp we mean any short range illuminating lamp or indicator light, to include at minimum, turn signals, brake lights, taillights, parking lights, or any similar lights commonly installed on moving vehicles.

This approach to integrating the ladar sensor into the headlamp assemblies and auxiliary lamp or indicator light assemblies will produce fields of view as shown in FIG. 9, with identical overlapping far field illumination and viewing patterns 11 projected along roadway 7. The overlapping horizontal projections of near field patterns 16 in FIG. 9 are from ladar sensors integrated into indicator lights 10 as shown in FIG. 2, or from integrated ladar sensor and headlamp assemblies 18 as discussed in FIGS. 3 and 4.

Figure 3:
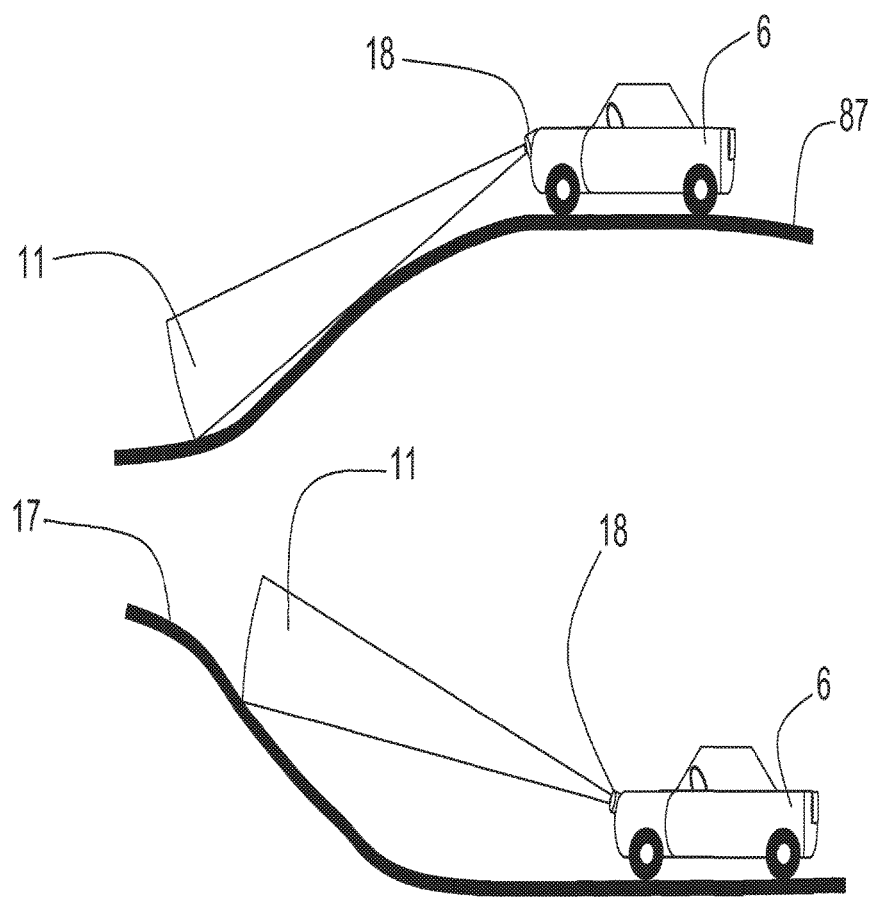
FIG. 3 is a side view of an automobile travelling along the crest of a hill and in the bottom of a dip in the road.

Referring to FIG. 3, an important feature of the integrated headlamp and ladar sensor we describe is the ability to steer the field of view of the ladar illumination pulse 11 along with the headlamps mechanically in the vertical and horizontal axes. The diagram in FIG. 3 shows a moving vehicle 6 travelling at the crest of a hill 87, with articulating ladar sensor and headlamp 18 at a depressed angle, illuminating the trough at the bottom of the curvature of the hill 87. Likewise, the bottom of FIG. 3 shows a moving vehicle 6 travelling at the bottom of a dip in the road, prior to ascending a hill, 17. In this view, the ladar sensor and headlamp assembly 18 is at an elevated angle, sweeping out the incline of the curvature of the hill, 17 rising in front of it.

Figure 4:
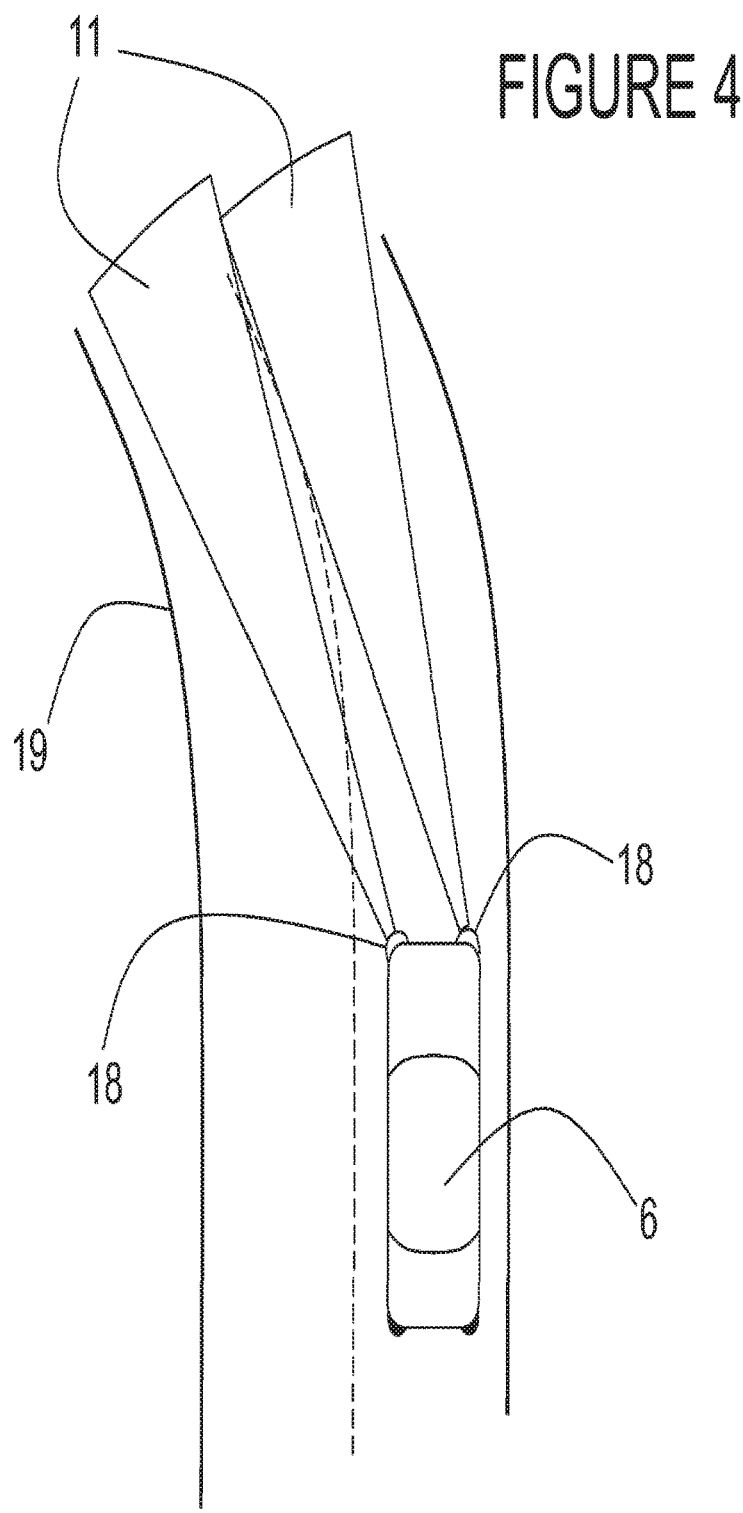
FIG. 4 is an overhead view of an automobile travelling along a section of a left-curving roadway.

FIG. 4 further illustrates the advantages of the beam steering capability of the ladar sensor and headlamp assembly 18. Pictured is a motor vehicle 6 approaching a bend to the left in the roadway 19. Both headlamp and ladar sensor far field beam patterns 11 are steered to the left to sweep out the area in the path of the vehicle at the greatest distance from the vehicle, therefore giving the greatest possible amount of time for collision threat detection and avoidance.

Figure 5:
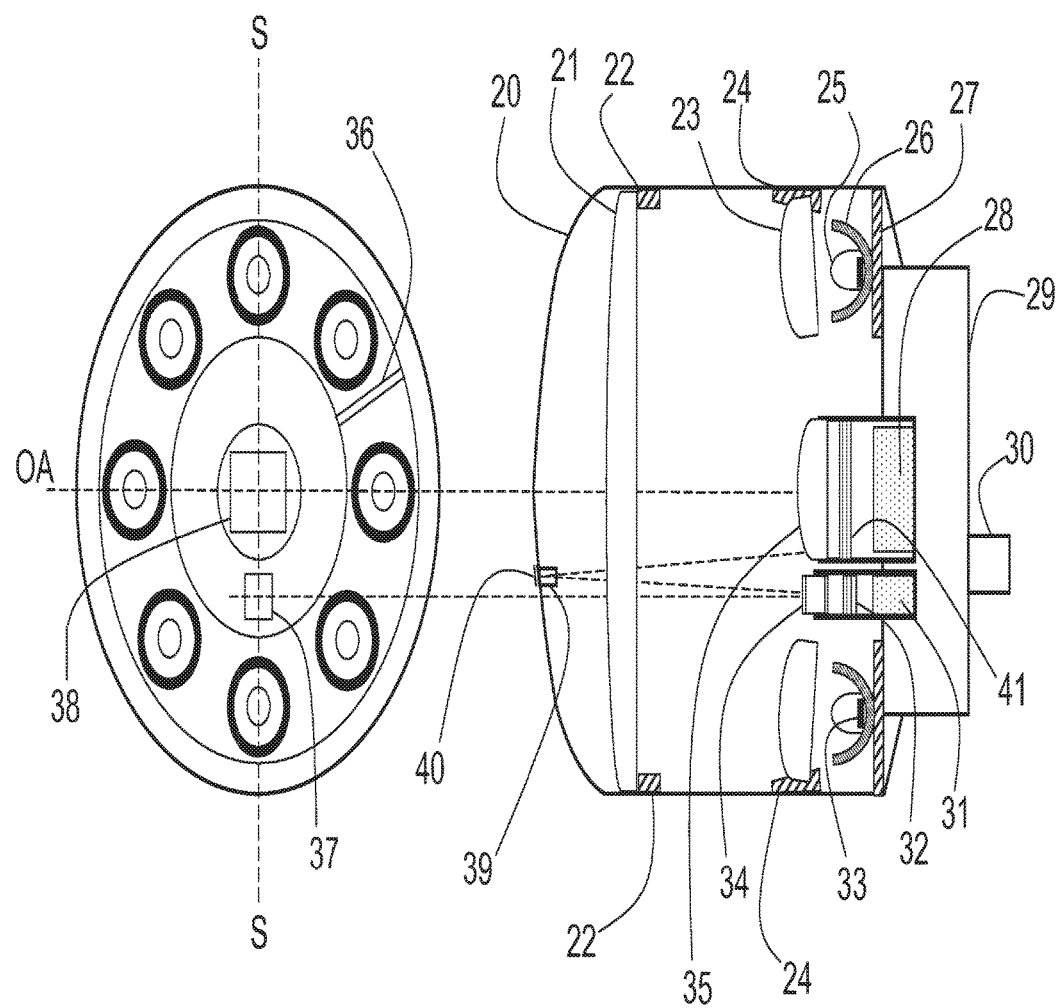
FIG. 5 is a diagram of an integrated headlamp and flash ladar sensor.

FIG. 5 illustrates a number of design and construction features of the integrated ladar sensor and headlamp assembly 18. At the right of FIG. 5 is shown a cross section showing details of the assembly taken along line SS. The assembly is contained within a glass or high impact plastic transparent envelope 20. A double lens system for collecting and focusing the light returned from the scene in the field of view is formed by large diameter lens 21 at the front of the assembly, which works with a second lens 35 directly in front of receive sensor 28. Receive sensor 28 is comprised of an infrared focal plane array mounted atop a readout integrated circuit and thermal management interface. The ladar sensor is comprised of laser light source 31, receive sensor 28, and additional electronics contained in electronics housing 29. Mounted between second lens 35 and receive sensor 28 is an optical bandpass filter 41 which blocks all wavelengths of light except the wavelength of the light from the laser light source 31, typically 1.57 microns in the preferred embodiment. The laser light source 31 may be a solid-state laser, semiconductor laser, fiber laser, or an array of semiconductor lasers. In the preferred embodiment, laser light source 31 is a disc shaped solid state laser of erbium doped phosphate glass pumped by 976 nanometer semiconductor laser light. In an alternative embodiment, laser light source 31 is an array of vertical cavity surface emitting lasers (VCSELs). The operation of receive sensor 28 will be discussed in greater detail in connection with FIG. 10, the system block diagram. Supporting the large diameter lens 21 are a number of lens supports 22 which may be thermosonically bonded to transparent envelope 20, or formed/molded into transparent envelope 20. Large diameter lens 21 may be of a material which has a different index of refraction at the transmission wavelength of 1.57 microns from the index of refraction it exhibits at the headlamp illumination wavelengths in the 0.45-0.65 micron range. This dichroic behavior of the material of large diameter lens 21 may be put to good use, creating different illumination patterns for the 1.57 micron ladar sensor illuminating laser 31, and the visible white light emitting diodes 33. Visible white LEDs 33 supplant the incandescent or halogen bulbs of traditional headlamps in the instant invention, due to their much higher efficiency, and therefore lower heat production. Shown on the left side of FIG. 5 is a radial arrangement of eight LED subassemblies (33, 25, and 26) for simplicity and clarity of the drawing, but the actual number of LED subassemblies is typically much greater, on the order of 32-128, depending on the power desired for the particular headlamp or indicator lamp application. An example of a benefit of a dichroic material for large diameter lens 21 is the ability to project an illuminating 1.57 micron laser pulse in a far field pattern 11 to match the far field pattern of the LED light sources 33, while at the same time illuminating the near field of the vehicle 6 with 1.57 micron pulsed laser light in a near field pattern 16, with little or no light from the LED light sources 33 being diverted into the near field. Because the near field of the vehicle is not directly visible from the driver's position, it makes sense to not divert optical flux from the LED visible light into the near field 16. It is preferred to have as much of the visible light transmitted so as to illuminate the driver's line of sight in the far field.

As noted above, LED light sources 33 are chosen for this application because of their high efficiency. The high efficiency of LED light sources produces real benefits to the integrated ladar sensor and headlamp in three significant ways. First, it reduces heating of the adjacent receive sensor 28 of the ladar sensor. The detector array of receive sensor 28 is typically a two dimensional array of Avalanche PhotoDiodes (APDs), which are sensitive to shifts in operating temperature, and must be operated at a fixed temperature in the preferred embodiment of the invention. In order to keep the temperature of the receive sensor 28 comprised of APD array and readout IC constant, thermoelectric coolers are used as a heat pump to remove excess heat to an associated heatsink at the rear of the electronics housing 29. Closed circuit control is then used to monitor and maintain the receive sensor 28 at a constant temperature by supplying a variable current to the thermoelectric coolers. Second, the ladar sensor may draw 30-40 watts of power from the vehicle electrical power systems. This additional power requirement can be offset by reducing the electrical power required to illuminate the roadway by substituting LEDs 33 for the traditional halogen or incandescent light sources, thus easing the burdens on the vehicle electrical system design, and facilitating the seamless integration of ladar sensing technology. Third, the dramatically increased life expectancy of the LED light sources reduces the probability the integrated ladar sensor and headlamp assembly 18 will have to be repaired during the life of the vehicle. Because the integrated ladar sensor and headlamp assembly 18 will of necessity be a subsystem with a higher value, the decision to repair or replace the integrated ladar sensor and headlamp 18, should be based on the higher value component, the ladar sensor. This repair/replace decision is facilitated if the light sources chosen have an extremely low failure rate and very long lifetime as do the LED light sources 33.

Each LED light source 33 typically has a molded aspherical lens 25 and reflector/director 26 to collect and project substantially all of the light emanating from LED light source 33 into the far field pattern 11. Additionally, an optional intermediate lens 23 may be positioned between the molded lens 25 and the large diameter lens 21 to provide additional conditioning of the visible light beam emanating from the LED light source 33. Intermediate lens 23 may be held in place by support features 24 molded into, formed in, or thermosonically welded to transparent envelope 20. The intermediate lens 23 may be made of a polymer, or a glass with flexibility and formed in a split ring, with split 36 designed to allow the ring to be compressed in diameter prior to inserting into transparent envelope 20. Once the intermediate lens 23 with split ring design is compressed, it may be engaged with the detent in support feature 24, and then released, allowing it to spring out to its full diameter, thereby retained and supported within transparent envelope 20 by support features 24. Visible LEDs 33 are mechanically supported and electrically connected via printed wiring board 27 which may be a printed circuit board made of fiberglass, alumina, aluminum nitride, or other insulator/conductor printed wiring system.

To complete the functionality of the integrated ladar sensor and headlamp 18, a laser light source is necessary and is shown located on a parallel axis with receive sensor 28. The laser light source has an eye safe filter 32 which limits the wavelength of light emitted through diffuser 34 to only those inherently eye-safe wavelengths of light. Diffuser 34 may be an ordinary refracting lens, an array of diffraction gratings, a series of ground or molded prisms, or a holographic diffuser. In the preferred embodiment, the wavelength of choice is in the range of 1.54-1.57 microns, though many other wavelengths may be useful as a source of illuminating laser light. A zero time reference is established by retro-reflector post 39 attached to transparent envelope 20 which indicates the leading edge of an outgoing laser pulse by feeding back a portion of the outgoing laser pulse energy to the receive sensor 28, which detects it and processes the pulse in the same manner as all succeeding reflections from the scene in the field of view of integrated ladar sensor and headlamp assembly 18. This reflected zero time reference optical signal is referred to locally as an Automatic Range Correction (ARC) signal, and the several pixels on receive sensor 28 illuminated by the ARC signal are referred to as ARC pixels, and are the zero time references for all range measurements made by integrated ladar sensor and headlamp assembly 18. Retro-reflector post 39 may be formed of a plastic or glass and may be integrally molded with transparent envelope 20 or bonded to transparent envelope 20 thermosonically. The preferred method is to have retro reflector post 39 integrally molded into transparent envelope 20 and to apply a white epoxy paint or metallic coating as a reflective coating 40 to the exterior of transparent envelope 20 in line with retro-reflector post 39. A metallic reflective coating 40 may be applied by any number of methods, including flame spraying, electroplating, or physical vapor deposition. Metallic coating may also be a thin film of metal applied under heat and pressure which causes the base material of transparent envelope 20 to reflow and permanently capture a metallic strip functioning as a metallic reflective coating 40. The metal chosen for a metallic retro-reflective coating or layer 40 should be impervious to the effects of corrosion as it is an outside, exposed surface. Materials such as stainless steel, nickel, gold, and platinum are appropriate for this function. Finally, a sealant, or passivation layer may be applied over a metallic reflective coating 40 to further reduce the potential effects of a corrosive environment by using any of the above mentioned processes. The preferred method is to use physical vapor deposition in which a target of glass is heated in a crucible within a vacuum chamber to deposit a thin layer of passivating glass over the corrosion resistant metallic reflective coating 40. Alternatively, if the transparent envelope 20 is plastic, any number of epoxy resins or plastic overmoldings may be applied as a passivating layer over reflective coating 40.

Forming the retro-reflecting post 40 within the transparent envelope 20 serves a dual purpose with respect to the ARC signal and ARC pixels. It is expected there will be some non-negligible and undesirable retroreflections from an outgoing laser illuminating pulse from laser light source 31 when the light pulse encounters scratches, dirt, dead bugs, ice, snow, or other light reflecting obstructions which may be adhered to the front surface of transparent envelope 20. It is important to have the ability to "gate out", or ignore, these signals by having an ARC signal which occurs later in time than these undesirable retro-reflections from the exterior surface of transparent envelope 20. The additional delay occasioned by the height of retro-reflector post 39 and its non-unity index of refraction, creates additional delay over the thin sections of transparent envelope 20, thus making the retro-reflected optical signal from a white or metallic reflective coating 40 occur slightly later in time than the undesired retroreflections from any materials adhered to the exterior surface of transparent envelope 20. At the far right of FIG. 5 is the interface connector 30 which carries bidirectional electrical signals, power, ground, and any necessary optical signals to and from the integrated ladar sensor and headlamp 18 and provides connections to the vehicle electrical and optical systems. Resident within electronics housing 29 are a serial communications port for bidirectional communications with a central ladar system controller (71 in FIG. 10), power conditioning electronics, and interface electronics including analog to digital converters for reporting the status of the integrated ladar sensor and headlamp 18, and its associated analog parameters such as temperature, voltage, power consumption, etc. The serial communications port also sends ordered pairs of range and intensity detected by the ladar sensor to the central ladar system controller (71 in FIG. 10) and receives commands therefrom to control the direction of the sensor, the intensity of the laser illuminating pulse and the intensity of the LED light sources 33. Electronics housing 29 also contains circuitry to convert digital signals and commands received from a central ladar system controller to analog values as required to point the integrated ladar sensor and headlamp 18, to brighten or dim LED light sources 33, or to run wiper/washer operations described in association with FIG. 6.

Shown at the left of FIG. 5 is a view looking into the integrated ladar sensor and headlamp 18 along the optical axis OA, showing a number of details of the design including the preferred rectangular shape 38 of receive sensor detector 28 as well as the rectangular shape 37 of the laser light source 31 of the preferred embodiment. FIG. 5 is not a scale drawing; rather it is intended to illustrate the various design concepts incorporated in the preferred embodiment. Other lensing options with multiple convex surfaces, with concave surfaces, and alternatively, with some prismatic or diffractive surfaces may be employed to achieve the desired effects described herein. A shorter range, wider field of view integrated ladar sensor and auxiliary lamp 10 as anticipated in FIGS. 2 and 4, is an adaptation of the design described in association with FIG. 5. The integrated ladar sensor and auxiliary lamp 10 uses a wide field of view lens with a short focal length such as a fisheye lens, or an array of diffractive gratings or prismatic elements to survey a field of view in excess of 90 degrees, and up to approximately 180 degrees. The term auxiliary lamp includes taillights, brake lights, parking lights, turn signal indicator lights, fog lights, etc., commonly found on the exterior of an automobile.

Figure 6:
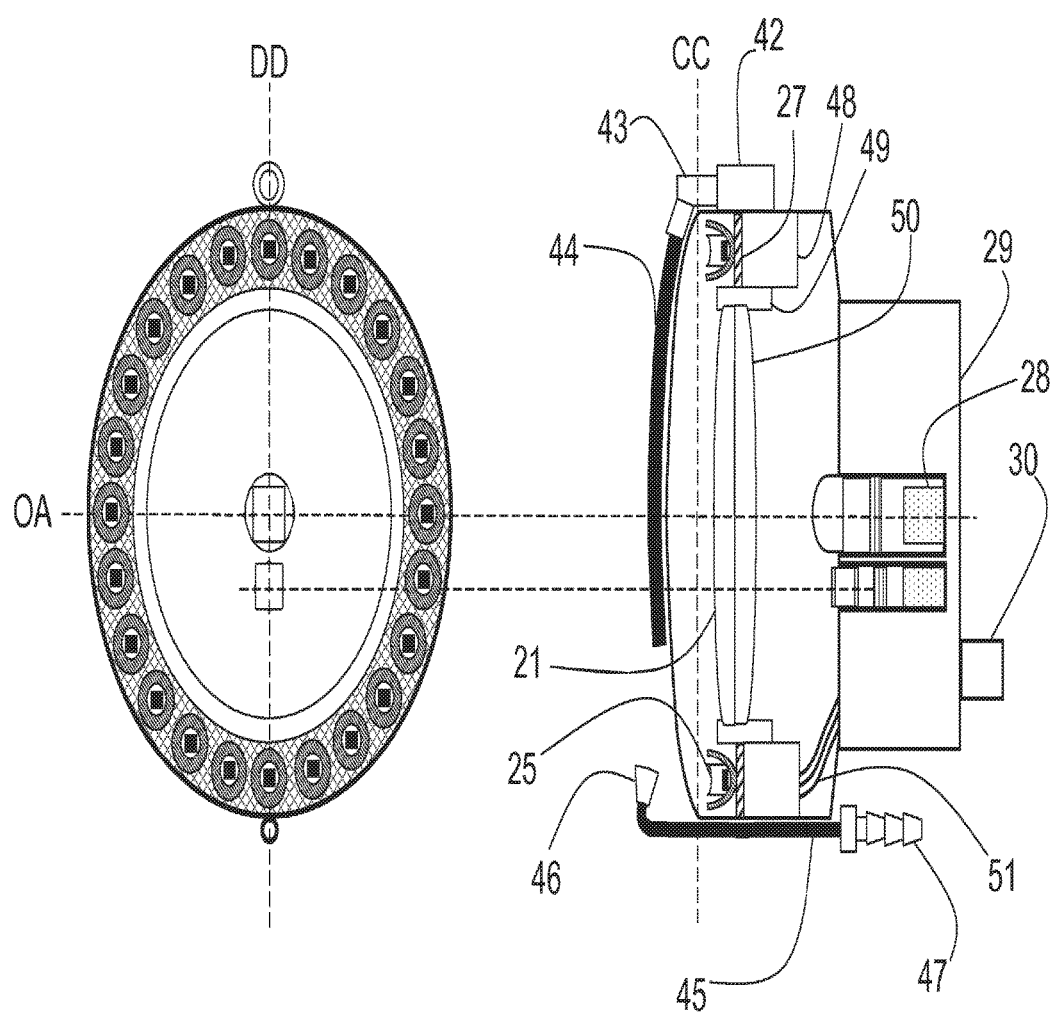
FIG. 6 is a diagram of an integrated headlamp and flash ladar sensor which illustrates an alternative arrangement of lensing elements for both illuminating the roadway with visible light and pulsed laser light, and collecting and directing reflected laser light to a detecting focal plane array, and shows washer and wiper hardware for keeping the forward surfaces clean.

FIG. 6 shows a number of optional features and alternative embodiments of integrated ladar sensor and headlamp assembly 18. The right half of FIG. 6 shows a cutaway view of integrated ladar sensor and headlamp 18 along section line DD. As noted with respect to the discussion of FIG. 5 above, there is a distinct possibility of non-negligible retro-reflections from a variety of materials which could be adhered to the exterior of transparent envelope 20. A wiper system comprised of electric motor 42, rotating shaft 43, and wiper blade 44 works together with washer fluid pumping tube 45 and washer fluid spray nozzle 46 to keep the exterior surface of integrated ladar sensor and headlamp assembly 18 free of bugs, dirt, snow, hail, etc. as much as possible in order to facilitate better 3-dimensional ladar sensor capability. Washer fluid pumping tube 45 has a hose fitting 47 extending towards the rear to engage with a hose from the vehicle windshield fluid reservoir and pump. A different optical design and layout are shown, with a greater number of visible LED subassemblies arranged in a radial pattern. Each LED subassembly in this case features a concave lens 25 together with a parabolic reflector of different shape for a different far field lighting effect. Circuit board support 48 is attached to transparent envelope 20 and creates a mounting point for the LED circuit board 27 assembly which is in a slightly more forward location in this embodiment of the design.

Connected to circuit board support 48 is lens mount 49 which is shown with two large diameter plano-convex lenses 21 and 50 mounted back to back to provide for a wide field of view for receive sensor 28, though a number of other lensing arrangements are anticipated, including convex, concave, and aspherical shapes as well as arrays of prismatic and diffractive surfaces. Electrical connections 51 carry power and ground, brightness control, and other bidirectional signals through circuit board support 48 and electronics housing 29 to interface connector 30 for connection to the vehicle electrical systems. A further benefit of using a washer fluid spray system is the location of washer fluid spray nozzle 46, which is positioned ideally to create a retro-reflected ARC signal suitable for illumination of the ARC pixels of receive sensor 28. To function reliably in this manner, washer fluid spray nozzle 46 should be made of a corrosion resistant metal alloy such as stainless steel, nickel, gold, or platinum, or be powder coated white. The location of washer fluid spray nozzle 46 well outside the exterior surface of transparent envelope 20, means the retro-reflected optical signals therefrom will be well delayed past any retro-reflected optical signals caused by bugs, mud, dirt, snow, or ice adhered to the exterior surfaces of transparent envelope 20, making for an excellent solution to the question of where to locate and how to provide for an appropriate retro-reflected ARC signal suitable for illuminating the ARC pixels of receive sensor 28.

Figure 7A:
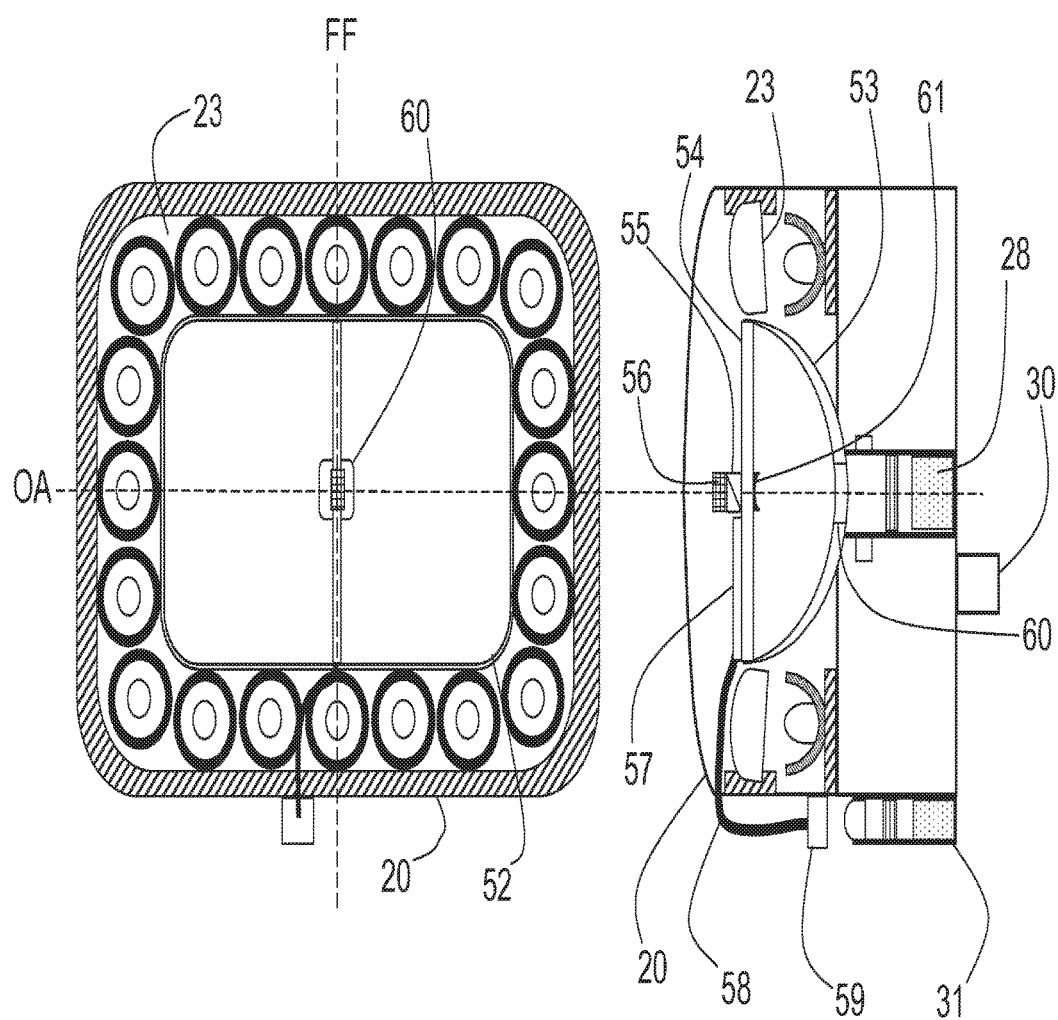
FIG. 7A is a diagram of an integrated headlamp and flash ladar sensor which illustrates a rectangular arrangement of lighting elements as well as a reflecting lens apparatus for receiving laser light reflected from the scene, and features a laser external to the assembly.

A common design trade-off for a ladar sensor is the range versus transmitted power consideration. Greater transmitted power yields additional range, at the expense of more complex laser designs, greater electrical power requirements, and therefore cost and weight of the system. FIG. 7A addresses this range problem in a new and unique manner with respect to ladar sensor design. Instead of arbitrarily increasing power to yield range enhancement, a much larger optical gain is realized in the ladar sensor optical receiver of this alternative embodiment by increasing the effective aperture of the ladar sensor optical receiver through beneficial use of a parabolic reflector 53 instead of the traditional glass or polymer lens elements of FIG. 5. Moreover, the aspect ratio of the optical aperture created by reflecting mirror 53 may be adjusted to be rectangular 52, circular, square, or any other desired geometry. FIG. 7A illustrates a number of features not found in FIGS. 5 and 6. At the left of FIG. 7A is a front view of the integrated ladar sensor and headlamp assembly 18. At the right of FIG. 7, a section of the front view along line FF looking to the left is shown. The parabolic reflector 53 captures light passing through the transparent envelope 20 and converges the captured incoming light at focus element 61 which is shown here as a secondary converging mirror, but may be a diverging mirror, or a convex or concave refracting lens, or a lens with an aspherical geometry. Focus element 61 conditions the light to pass through mirror aperture 60 so as to fall on the active area of receive sensor 28. Focus element 61 is positioned and held in place by support beam 54 which is permanently affixed to, or integrally molded into, parabolic reflecting mirror 53. Reflecting mirror 53 has a parabolic profile in the preferred embodiment and may be molded or formed out of metal, glass, or a fiber reinforced polymer, or another material suited to a particular application. Reflecting mirror 53 may alternatively be created in a characteristic shape which is spherical, hyperbolic, exponential, or another geometry which suits a particular application. The refractive lens designs as in FIGS. 5 and 6 do not scale easily to large apertures and higher optical gains. A circular headlamp assembly may typically be 7 inches in diameter, thus leaving 6 inches for a large diameter lens 21 of FIGS. 5, 6. Such a large diameter lens 21 manufactured out of a solid glass blank will be expensive and heavy, and require a more substantial mechanical mounting system, with the additional associated weight and cost. Because the parabolic reflector 53 may be cast, molded, or formed out of a thin walled glass, powder metal, or fiber reinforced polymer, it will be much lighter for a given aperture and optical gain than an equivalent solid glass lens. This resultant lower weight has many benefits for man-portable and flight systems, and has a much lower cost of fabrication.

The laser illuminating source 31 in the design embodiment of FIG. 7A is positioned outside the transparent envelope 20 of the integrated ladar sensor and headlamp 18, and is coupled through a fiber coupler 59 and flexible optical fiber 58 and rigid lightguide 57 to corner cube 55. Corner cube 55 rotates the transmission axis of the illuminating laser light 90 degrees into alignment with the optical axis shown as dashed line OA of the integrated ladar sensor and headlamp assembly 18. Corner cube 55 may be a high quality device made of ground glass coated with a reflecting mirror surface and mounted to support beam 54 using epoxy, adhesive or mechanical means such as C-clips, U-clips or other friction or compression fasteners, or assembled to diffuser 56 and then attached as a compound unit to support beam 54 using any of the aforementioned attachment methods. Corner cube 55 may alternatively be integrally formed with support beam 54 and coated with a reflective metallic surface, with diffuser 56 attached thereto. Diffuser 56 acts to distribute the illuminating laser light in any of the desired patterns discussed herein, and may be an arrayed waveguide grating, interference filter, holographic diffuser, or other diffractive optic construction. Diffuser 56 may be bonded to corner cube 55 by any number of methods including glass bonding, epoxy or adhesive bonding, or mechanical mounting using sheet metal C-clips, U-clips, or other compression and friction fasteners. Shown at the left of FIG. 7A is the rectangular aspect of secondary lens 23 which is optionally included in the various embodiments shown herein. Also visible is the rectangular aspect of mirror aperture 60, though other shapes are anticipated depending on particular applications of the invention as described herein.

FIG. 7B illustrates a number of refinements to the integrated ladar sensor and headlamp assembly 18 incorporating a reflecting mirror 53. At the left of FIG. 7B is a front view of the integrated ladar sensor and headlamp assembly 18. At the right of FIG. 7B, a section of the front view along line FF looking to the left is shown. First, support beam 54 has been angled so focus element 61 can be above, or in this case, in advance of reflecting mirror 53, thus increasing the focal length of reflecting mirror 53, which is desirable in some cases to allow for an increased optical aperture without penalizing the optical performance. Increase of the optical aperture is desirable to produce a positive effect on optical gain. In this drawing it can be seen the proximity of diffuser 56, corner cube 55, and focus element 61 to the interior surface of transparent envelope 20 allows for them to be bonded directly to the transparent envelope 20 and for support beam 54 to be eliminated in low cost applications. An automobile might have two of this type of integrated ladar sensor and headlamp assembly 18, plus four wide field of view ladar sensors integrated with auxiliary lighting assemblies 18, resulting in the need for up to six laser light illuminating sources 31. A further cost reduction mechanism anticipated is the concentration of all six laser illuminating sources into one central laser unit with a six-way power split output. This system architecture will be discussed in association with FIG. 11. Shown in FIG. 7B is flexible optical fiber 58 connecting within transparent envelope 20 through to interface connector 30 which in this embodiment connects to the vehicle optical and electrical harness (not shown in this FIG.). The optical transmission lines within the optical and electrical wiring harness then connect to a central illuminating laser source which will be discussed in association with FIG. 11.

FIG. 8 illustrates details of the mechanism which provides the ability to point the integrated ladar sensor and headlamp assembly 18 both left and right, and up and down and responds to electrical positioning signals received over sub-assembly wiring harness 65. Attached to transparent envelope 20 are two motorized horizontal pivots 62 positioned at the top and bottom of transparent envelope 20 which can rotate transparent envelope 20 both left (counter-clockwise) and right (clockwise) around vertical axis line VA. The second horizontal pivot 62 at the bottom of FIG. 8 may be motorized, or may be a passive pivot consisting primarily of a rotary bearing. Motorized horizontal pivot 62 has electrical connections 66 which provide power, ground, and motor control to the motorized horizontal pivot 62, and return motor status and rotational position status signals from the motorized horizontal pivot 62. An outer housing 68 provides an attachment point for motorized horizontal pivots 62, and may be in the shape of a full shell adapted to the contours of transparent envelope 20, with adequate clearance to allow for a full range of horizontal and vertical angular displacement of transparent envelope 20. Outer housing 68 is typically a full shell when the integrated ladar sensor and headlamp 18 is mounted on external hard points such as might be found on a military or utility vehicle. Alternatively, if the integrated ladar sensor and headlamp 18 is housed in a recessed opening in the body of a vehicle, as is typical in an automotive application, the full shell design for outer housing 68 can be replaced with a very simple open yoke which has a flattened toroid shape and only has sufficient depth to provide attachment to both motorized horizontal pivots 62 and motorized vertical pivots 63. Horizontal pivots 62 and vertical pivots 63 and their respective rotational axes typically lie in the same plane. Motorized vertical pivots 63 attach to outer housing 68 and act to point the subassembly consisting of the outer housing 68, motorized horizontal pivots 62, and transparent envelope 20 up or down depending on electrical control signals received over electrical connections 67. The second vertical pivot at the left of FIG. 8 need not be motorized, and may be a simple passive pivot with rotary bearing. Electrical connections 67 provide power ground, and motor control signals to motorized vertical pivots 63, and return motor status and angular position to a central controller. Both sets of electrical signal wires 66 and 67 pass through a vehicle mount 64 which may be a recess in a body panel in an automotive application, or a mounting bracket on an exterior surface of a utility or military vehicle. These two independent sets of electrical connections 66 and 67 then merge in a sub-assembly wiring harness 65 before terminating in an electrical connector 69 which is adapted to connect to the vehicle electrical systems.

FIG. 9 shows an overhead view of an automobile 6 equipped with two of the integrated ladar sensor and headlamp assemblies 18 described in the text and in FIGS. 5-8 above. The automobile is also equipped with short range integrated ladar and auxiliary lamp assemblies 10 at the four corners of the vehicle. The long range integrated ladar sensor and headlamp assemblies 18 provide a narrow and long distance field of view 11 along the length of straight roadway 7, while the short range integrated ladar sensor and auxiliary lamp assemblies 10 provide an overlapping and much wider and shorter range field of view 16. Typically the shorter range integrated ladar sensor and auxiliary lamp assemblies 10 are not capable of traversing, but operate in a staring mode, to reduce complexity and costs associated with the auxiliary lighting functions. In staring mode short range sensors are not capable of traversing in either a lateral angle or vertical angle like the headlamp assemblies. The overlapping region 70 between short range fields of view 16 at the rear of the vehicle is an area where object identification can be enhanced by post processing and comparing the 3-D images from the left and right short range integrated ladar and auxiliary light assemblies 10. Object identification can be enhanced by the object rotating or moving through the field of view, or by the motion of the observing platform, or by simultaneous capture of 3-D information from two or more surfaces on the object not directly viewable from the same point of view, necessitating two independent ladar sensors with fields of view converging on the object in question as in overlapping region 70.

FIG. 10 shows a simplified system block diagram of a typical installation on a vehicle as anticipated herein and described in the preceding FIGS. 1-9. A ladar based collision avoidance system consisting of a central ladar system controller 71 connects to six independent ladar sensors through bidirectional connections 72 and 73. Two long range units, each comprising an integrated ladar sensor and headlamp 18, connect to system controller 71 through a set of bidirectional electrical and optical connections 72. Connections 72 are comprised of electrical wires, optical fibers, and hybrid electrical/optical connectors in the preferred embodiment. Four short range units, each comprising an integrated ladar sensor and auxiliary lamp 10 connect to the system controller 71 through a set of bidirectional optical/electrical connections 73. Connections 73 are comprised of electrical wires, optical fibers, and hybrid electrical/optical connectors in the preferred embodiment. Each integrated ladar sensor and headlamp 18 and integrated ladar sensor and auxiliary light 10 have at their core a receive sensor 28 first referenced herein in connection with the discussion of FIG. 5. Receive sensor 28 is comprised of a two-dimensional focal plane array of avalanche photodetectors mounted atop a readout integrated circuit in the preferred embodiment. A square array of 128×128 avalanche photodetectors on an indium phosphide substrate comprises the focal plane array of the preferred embodiment. The focal plane array is bonded to and electrically connected to a readout integrated circuit via a square array of 128×128 indium bumps formed on the circuit side of the focal plane array. Each detector of the array is individually connected to a unit cell of the readout integrated circuit. The unit cell contains an input low noise amplifier, bandpass filter, threshold detecting circuit, analog sampler, and analog sample shift register, as well as a timing circuit referenced to a global input indicating the start of a laser illuminating pulse. Other signal conditioning circuitry resides on the readout integrated circuit which enable high fidelity reception and detection of low level optical signals reflected from objects and features in the field of view of the ladar sensor. Additional support circuitry resides on printed circuit boards within electronics housing 29 of FIG. 5 which provide global timing references, buffer the readout integrated circuit outputs, convert analog signals to digital signals, convert digital signals to analog signals, provide necessary bias voltages, and set or adjust variables used within receive sensor 28. Each ladar sensor of the preferred embodiment is of the flash ladar type. As used herein, a flash ladar is capable of illuminating a field of view with a single pulse of laser light, detecting the reflections from the field of view incident upon a two-dimensional array of light sensitive pixels, and measuring both the intensity and range to each feature in the field of view identifiable by an optical return incident upon a pixel in the two-dimensional array. Further details of the operation of receive sensor 28 are given in the citations of the present inventors previous work in the prior art references which are incorporated herein by reference FIG. 11 details the inner workings of ladar system controller 71 and amplifies on the nature of its interoperation with a variety of external integrated ladar sensor and vehicle headlamp and signal lamp modules. Ladar system controller 71 is comprised of seven basic elements, each connected and operating as follows in this preferred embodiment. A digital processor/controller 81 supervises the operations of the ladar system controller internal components, as well as controlling communications with the host vehicle through bidirectional connections 85. Processor/controller 81 is a general purpose microcomputer integrated circuit in the preferred embodiment, but may be a specialized automotive processor adapted specifically to a vehicle manufacturer requirement, or a state machine such as a field programmable gate array or other programmable logic device. If the processor/controller 81 is a state machine type of device, non-volatile memory 80 is not required and can be eliminated. Typically, upon power-up of the ladar system controller 71, processor/controller 81 initiates a boot-up sequence wherein the non-volatile memory 80 is accessed for the operating firmware which is loaded into a memory resident within processor/controller 81. The memory resident within processor/controller 81 is typically volatile memory such as DRAM. Non-volatile memory 80 may also be resident on some processor/controller 81 integrated circuit designs in the form of ROM or PROM. If sufficient non-volatile memory is available within processor/controller 81, external non-volatile memory 80 may be eliminated to reduce cost and simplify design. Normally, non-volatile memory 80 is comprised of ROM, PROM, Flash memory, or optical or magnetic storage media.

Processor/controller 81 supervises the data communications port 82, which is a general purpose Ethernet port in the preferred embodiment. Data communications port 82 may also be of a type specifically adapted to the vehicle market such as a CAN bus interface port, IDB-1394, SAE J1708 interface, or any of a multiplicity of other choices. Data communications port 82 may also be resident on processor/controller 81, and is often included on many commercially available general purpose and automotive digital controller integrated circuit designs. The host vehicle 6 may also provide through bidirectional connections 85 and data communications port 82 periodic updates to the firmware resident on the non-volatile memory 80, which would typically occur during scheduled maintenance visits or vehicle recalls. The host vehicle may also provide through data communications port 82 a number of important data to the ladar system controller 71 during normal operation, such as current time and date, vehicle position, speed, acceleration, turning rate, angle of incline/decline, weather data, or other vehicle or global data useful in managing and controlling the vehicle ladar sensors and headlamps and auxiliary lamps.

Processor/controller 81 determines the timing and initiates the pulsing of illuminating pulsed laser transmitter 79 in the embodiment detailed in FIG. 11. The pulsed laser transmitter 79 is a low power or medium power semiconductor laser in this alternative embodiment, with output in the 1.54-1.57 micron wavelength. The optical output of pulsed laser transmitter 79 is passed through a length of erbium doped optical fiber which is simultaneously optically pumped by a number of semiconductor laser diodes at a nominal wavelength of 976 nanometers, though other wavelengths of pump light may be used. The amplifier/pump diodes module 78, comprised of a coil of erbium doped fiber and several pump laser diodes create an amplified and intensified optical illuminating pulse with sufficient power to illuminate all of the required fields of view (1,2,3,4,5,11 or 16) of the various and several ladar sensors positioned on the vehicle 6. Pulsed laser transmitter 79 and amplifier/pump diodes 78 are typically housed together in laser transmitter module 86, but other arrangements are anticipated. The output of laser transmitter module 86 is then split into six output fibers 76 by optical power divider 77. Optical power divider 77 typically splits the optical signal from laser transmitter 79 into six fiber outputs 76 with unequal power ratios. Optical power divider 77 may be an optical fiber coupler, or may be comprised of a series of neutral density filters, or may be a spatial optical power divider using a lens to condition the optical propagating mode appropriately to be divided amongst a number of optical outputs. Two high power laser light signals are provided for use by long range units LRU1 and LRU2, which are typically of the type of integrated ladar sensor and headlamp 18 described in FIGS. 5-8. Four lower power laser light signals are provided for use by short range units SRU1-SRU4, which are typically of the type of integrated ladar sensor and auxiliary lamp 10 described in FIGS. 5-8. The six fiber outputs 76 are connected to the remote ladar sensor units SRU1-SRU4 and LRU1 and LRU2 through a fiber cable and wire harness 74 which may be routed throughout the vehicle in parallel with the host vehicle 6 wiring harness.

Connections to each long range integrated ladar sensor and headlamp unit 18 at the terminus of the fiber cable and wire harness 74 are made through bidirectional connections 72 as described with respect to FIG. 10. Connections to each short range integrated ladar sensor and auxiliary lamp unit 10 at the terminus of fiber cable and wire harness 74 are made through bidirectional connections 73 as described with respect to FIG. 10. In an alternative to the embodiment of laser transmitter 86 described above, the coil of erbium-doped fiber is removed from amplifier/pump diode module 78, and a length of erbium doped fiber is connected between output fibers 76 and each ladar sensor unit 10 or 18 positioned on the vehicle 6 periphery. The fiber cable and wire harness 74 is in this alternative embodiment an active optical system, with six separate optically amplifying erbium doped fibers routed through the harness 74. Fiber cable and wire harness 74 may be partially comprised of steel or metallic wire, Kevlar®, or other fiber strength members. Fiber cable and wire harness 74 is typically also comprised of conductive wires of copper, aluminum, German silver, or other electrically conductive material. Fiber cable and wire harness 74 also comprises a number of optical waveguides suitable for optical communications or transfer of high power optical pulses, and fabricated from any number of glass or polymer compounds characterized for these purposes. Finally, the individual strength members and electrical conductors and optical waveguides of fiber cable and wire harness 74 are typically bound together by tape wound around the bundle, plastic tubing slipped over the bundle, or a plastic jacket overmolded onto the outside of the bundle.

Processor/controller 81 also connects to sensor interface 84 which serves to condition the digital signals from processor/controller 81 appropriately for transmission to any one of two long range sensor units 18 or four short range sensor units 10. Sensor Interface 84 has six bidirectional connection ports 75 which carry signals to ladar sensor units 10 and 18, and return signals therefrom. These six bidirectional connection ports 75 connect with electrical conductors and optical waveguides embedded within fiber cable and wire harness 74. The bidirectional connection ports 75 may be parallel electrical bus, serial electrical interface, serial or parallel optical interface, or some combination of electrical and optical interfaces, and also provide electrical power and ground return signals in the preferred embodiment. Sensor interface 84 also receives status signals and data signals from each of the long range sensor units 18 and short range sensor units 10 through connections 72 and 73, fiber cable and wire harness 74, and bidirectional connection ports 75. The data signals consist of range and intensity pairs for each pixel in a two-dimensional focal plane array, which provide a complete 3-D image of an object or scene in the field of view of the sensor, from a single point of view. Sensor interface 84 passes status data to processor controller 81 and object and scene data in the form of ordered range and intensity pairs to scene processor 83. Sensor interface 84 may contain analog to digital converters, digital to analog converters, pulse width modulation circuits, or any of a variety of other interface type circuits useful for controlling and monitoring a remote peripheral ladar and lighting subsystem. Sensor interface 84 may be an integrated circuit, and in some cases, may be resident on processor/controller 81.

Scene processor 83 makes use of the data received from all six ladar sensors of the short range type 10 and long range type 18 to synthesize a composite view of the area in front of, behind, and surrounding the vehicle 6 and objects within these fields of view (1,2,3,4,5,11, and 16). Scene processor 83 also identifies and tracks objects both static and moving within the composited scene and features in the scene posing a risk, and may also compute the relative risk and timing of a potential impact with any of these objects or features in the composited scene. Alternatively, scene processor 83 may be resident outside of ladar system controller 71 and be associated with the host vehicle 6 central computing function, in which case ordered pairs of scene data are merely passed from sensor interface 84 directly to data communications port 82 and thence to the host vehicle 6 for further processing. It is also envisioned ladar system controller 71 may be entirely encompassed within the vehicle 6 central electronics and computing function, and may even be largely realized as a software/firmware function executable on the vehicle 6 standard computing platform. Several modes of operation for the overall collision avoidance function are envisioned. A first mode, enabled by the several described embodiments, consists of simply displaying a 3-D graphics image showing the various details of stationary features in the scene and objects in motion which may be in the path of the vehicle 6 or on a collision course with the host vehicle 6. This first described mode relies on the vehicle 6 operator to make judgements and apply vehicle controls appropriately to maneuver the vehicle 6. This first described mode is fully supported by the specification herein minus the details of the display. A second mode, in which warnings of an impending collision are communicated to the vehicle operator, relies on a collision threat computation made by scene processor 83 or by the host vehicle 6 systems based on the 3-D range and intensity data provided by the various embodiments described herein. In this second mode, the specification of the Flash LADAR Collision Avoidance System as described herein may require the host vehicle to make computations of risk based on the 3-D data provided, and warn the vehicle 6 operator by visual, tactile, or auditory means. In a third operational mode, host vehicle 6 makes computations of risk or threat of collision based on 3-D data provided by the invention described herein, and applies control to vehicle 6 steering, braking, and engine systems to effect collision avoidance and/or steer and guide the vehicle autonomously. All three of the described collision avoidance modes are supported and enhanced by the presence and operation of the Flash LADAR Collision Avoidance System comprised of the various embodiments described herein in association with the numbered drawings.

Although the invention of the Flash LADAR Collision Avoidance System and the integrated ladar sensor and headlamp/auxiliary lamp and associated systems have been specified in terms of preferred and alternative embodiments, it is intended the invention shall be described by the following claims and their equivalents.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

The invention claimed is:

1. A ladar sensor mounted to a vehicle, said ladar sensor having a field of view and illuminating pattern, the ladar sensor housed within an envelope and the envelope mounted to the vehicle, the envelope having a transparent surface adapted to transmit laser light, the ladar sensor further comprising:
    a pulsed laser transmitter having a wavelength of transmission and a pulsed light output and diffusing optic and adapted to emit a laser light pulse to illuminate a scene in the field of view of the ladar sensor, and
    a time zero reference circuit having a time zero output, said time zero output adapted to signal the instant of emission of the laser light pulse,
    a receiving lens assembly having an optical transmission path, and adapted to collect and focus light reflected from the scene,
    an optical bandpass filter positioned in the optical transmission path of the receiving lens assembly, and adapted to transmit light at the wavelength of transmission, and to block other wavelengths of light,
    a regular geometric array of light sensitive detectors positioned at a focal plane of the receiving lens assembly, and each individual light sensitive detector having an output terminal producing an electrical pulse when illuminated by a reflected portion of the laser light pulse,
    a readout integrated circuit comprising a regular geometric array of unit cell electrical circuits, each unit cell electrical circuit having an input connected to the output terminal of an individual light sensitive detector,
    and each unit cell electrical circuit adapted to amplify and detect said electrical pulse, and said unit cell electrical circuit having a detected pulse output and a timing circuit, the timing circuit connected to the detected pulse output, and the timing circuit also connected to the time zero output, and
    and each timing circuit having an elapsed time output producing an elapsed time measurement value indicating the time delay between the emission of the laser light pulse and an electrical pulse indicated by the detected pulse output,
    said readout integrated circuit connected to the elapsed time outputs, and the readout integrated circuit adapted to collect and transmit said elapsed time outputs; and,
    a system controller mounted to the vehicle, and
    the ladar sensor connected to the system controller via bidirectional connections.

2. The ladar sensor of claim 1, wherein the pulsed laser transmitter further comprises an eye safe filter for limiting the wavelength of light transmitted through the diffusing optic.

3. The ladar sensor of claim 1 wherein the pulsed laser transmitter comprises an optically pumped solid state laser gain media.

4. The ladar sensor of claim 1 further comprising a digital processor adapted to identify objects.

5. The ladar sensor of claim 1 wherein the envelope is mounted to a bracket, and the bracket is mounted to a mounting point of the vehicle.

6. The ladar sensor of claim 1 wherein the envelope is mounted to a motorized pivot, and the motorized pivot is mounted to a mounting point of the vehicle.

7. The ladar sensor of claim 1 wherein the envelope is mounted within a recess in a body panel of the vehicle.

8. The ladar sensor of claim 1 wherein the two dimensional focal plane array of infrared light sensitive detectors is comprised of a detector type selected from the set of avalanche photodiodes, and PIN photodiodes.

9. The ladar sensor of claim 1 wherein the pulsed light output is steerable by an applied electrical signal.

10. The ladar sensor of claim 1 wherein the pulsed laser light output is from a semiconductor laser.

11. The ladar sensor of claim 1 wherein the pulsed laser light output is from a vertical cavity surface emitting laser.

12. The ladar sensor of claim 1 wherein the ladar sensor has a digital processor adapted to identify objects in the field of view.

13. The ladar sensor of claim 1 wherein the light collecting and focusing lens comprises a reflecting mirror.

14. A robotic driving system adapted to steer a vehicle autonomously comprising:
at least one ladar sensor mounted to the vehicle and,
a system controller,
and the ladar sensor connected to said system controller via bidirectional connections, the bidirectional connections comprising;
a cable assembly routed through the vehicle, the cable assembly further comprising;
a first end connected to the system controller, and
a connector at a second end adapted to connect to the ladar sensor;
and the ladar sensor having a field of view, and housed within an envelope and mounted to the vehicle, said envelope having a device connector adapted to mate with the cable assembly, and the envelope having a transparent surface adapted to transmit infrared light;
said ladar sensor further comprising,
a pulsed laser transmitter having a transmission wavelength, and a pulsed light output and diffusing optic, and is adapted to emit a laser light pulse to illuminate a scene in the field of view, and
a time zero reference circuit having a time zero output, said time zero output adapted to signal the instant of emission of the laser light pulse,
a receiving lens assembly having an optical transmission path, and adapted to collect and focus light reflected from the scene,
an optical bandpass filter positioned in the optical transmission path of the receiving lens assembly, and adapted to transmit light at the wavelength of transmission, and to block other wavelengths of light,
a regular geometric array of light sensitive detectors positioned at a focal point of the light collecting and focusing lens, and each light sensitive detector having an output terminal producing an electrical pulse when illuminated by a reflected portion of the laser light pulse,
a readout integrated circuit comprised of a regular geometric array of unit cell electrical circuits, and each unit cell electrical circuit having an input connected to the output terminal of a light sensitive detector,
and each unit cell electrical circuit adapted to amplify and detect said electrical pulse, and the unit cell electrical circuit having a detected pulse output, and
a plurality of timing circuits, and each timing circuit connected to a detected pulse output, and also connected to the time zero output, and
said timing circuit having an elapsed time output, and producing an elapsed time value indicating the time delay between the emission of the laser light pulse and the detected pulse output from the associated unit cell electrical circuit,
and said readout integrated circuit connected to a plurality of the elapsed time outputs, and the readout integrated circuit adapted to collect and transmit via the cable assembly the elapsed time values,
and said system controller further having a digital processor adapted to make an optimum path computation, and the system controller also having a control output connected to the vehicle steering, and thereby navigating the vehicle.

15. The robotic driving system of claim 14 wherein the pulsed laser transmitter is formed in a solid state crystal containing an element from the group comprising: erbium, neodymium, yttrium, and aluminum.

16. The robotic driving system of claim 14 wherein the vehicle has a digital processor adapted to identify objects.

17. A ladar sensor comprising:
a laser transmitter configured to produce a pulsed light output at a wavelength of transmission;
a diffusing optic coupled to the laser transmitter to receive and diffuse the pulsed light output and illuminate a scene in a field of view;
a time zero reference circuit generating a time zero output, the time zero output adapted to signal an instant of emission of the pulsed light output;
a receiving lens assembly configured to collect and focus light reflected from the scene;
an optical bandpass filter disposed in the receiving lens assembly and configured to transmit light reflected from the scene at the wavelength of transmission while blocking other wavelengths of light;
a plurality of light sensitive detectors positioned to receive the light reflected from the scene, wherein each light sensitive detector produces an electrical signal when illuminated by the light reflected from the scene;
a readout integrated circuit comprising a plurality of unit cell electrical circuits, each unit cell electrical circuit coupled to one of the light sensitive detectors and configured to amplify and detect the electrical signal from the light sensitive detector and provide a detected pulse output;
each unit cell electrical circuit also comprising a timing circuit in communication with the time zero output and configured to produce an elapsed time measurement value indicating the time delay between the emission of the pulsed light output and the electrical signal indicated by the detected pulse output,
the readout integrated circuit configured to collect and transmit the elapsed time measurement values from the timing circuits.

18. The ladar sensor of claim 17, further comprising an eye safe filter for limiting the wavelength of light transmitted through the diffusing optic.

19. The ladar sensor of claim 17, further comprising a digital processor in communication with the readout integrated circuit adapted to identify objects based at least in part on the elapsed time measurement values.

* * * * *